(12) United States Patent  
Yamamoto

(10) Patent No.: US 8,711,382 B2  
(45) Date of Patent: Apr. 29, 2014

(54) PRINT SYSTEM

(75) Inventor: Tetsuji Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 489 days.

(21) Appl. No.: 13/082,598

(22) Filed: Apr. 8, 2011

(65) Prior Publication Data

US 2011/0261402 A1  Oct. 27, 2011

(30) Foreign Application Priority Data

Apr. 26, 2010  (JP) ................... 2010-100966

(51) Int. Cl.
- *G06K 15/00* (2006.01)
- *G06F 3/12* (2006.01)
- *H04N 1/00* (2006.01)
- *G06F 7/04* (2006.01)
- *G06K 9/00* (2006.01)

(52) U.S. Cl.
USPC ......... 358/1.14; 358/402; 358/403; 358/1.15; 726/4; 726/26; 382/115

(58) Field of Classification Search
None
See application file for complete search history.

(56) References Cited

U.S. PATENT DOCUMENTS

| | | | |
|---|---|---|---|
| 5,367,366 A | 11/1994 | Kido et al. | |
| 2007/0146778 A1* | 6/2007 | Kitagata et al. | 358/1.15 |
| 2008/0117452 A1 | 5/2008 | Murakami | |
| 2009/0025072 A1 | 1/2009 | Kondo | |
| 2009/0033990 A1* | 2/2009 | Matsugashita | 358/1.15 |
| 2009/0057402 A1 | 3/2009 | Yoshida | |
| 2009/0059276 A1* | 3/2009 | Matsuo | 358/1.15 |
| 2009/0310166 A1* | 12/2009 | Kanemitsu | 358/1.15 |
| 2009/0310172 A1 | 12/2009 | Miyamoto | |

FOREIGN PATENT DOCUMENTS

| | | |
|---|---|---|
| CN | 101187964 A | 5/2008 |
| JP | 6-11946 A | 1/1994 |
| JP | 2007-87257 A | 4/2007 |
| JP | 2007-148803 A | 6/2007 |
| JP | 2007-183743 A | 7/2007 |
| JP | 2008-102614 A | 5/2008 |
| JP | 2009-27363 A | 2/2009 |
| JP | 2009-53953 A | 3/2009 |
| JP | 2009-80775 A | 4/2009 |
| JP | 2009-303008 A | 12/2009 |

* cited by examiner

*Primary Examiner* — Thomas Lett  
(74) *Attorney, Agent, or Firm* — Birch, Stewart, Kolasch & Birch, LLP

(57) ABSTRACT

In one embodiment of a print system, a client terminal (10) that generates a print job, a server function portion that stores the print job, a printer (30) that performs pull printing of the print job are connected via the network (40). The print job holds print data and authority information including user information for specifying a user having print authority over the print data. The client terminal (10) is provided with an authority setting means for setting authority information. A server (20) is provided with the server function portion, and is configured to update authority information, identify a user, authenticate whether or not to permit printing based on the authority information and the identification result obtained by a user identification means, and transmit print data.

13 Claims, 12 Drawing Sheets

FIG.2

Display screen X

| | | |
|---|---|---|
| 51 — Registration | Number of copies | 1 ▲▼ |
| | Original size | A3 ▼ |
| | Original orientation | Horizontal ▼ |
| 52 — Print authority setting | Number of pages per sheet | 2 ▼ |
| | Paper information | Plain paper ▼ |

| Authority information | Print job number |  |
|---|---|---|
| | Job registrant ID | |
| | Authority possessor table | |
| Print data | | |

Display screen Z

FIG.8

| Notification No. | Notification content |
|---|---|
| 1 | Printing has been requested from user XX (print request) |
| 2 | Print authority has been deleted (authority deletion) |
| 3 | Data was not printed within time limit (request failure) |
| 4 | Printing has ended (end of printing) |
| 5 | Printing is not permitted (printing not allowed) |

PRINT SYSTEM

CROSS-REFERENCE TO RELATED APPLICATION

This application claims priority under 35 U.S.C. §119(a) on Patent Application No. 2010-100966 filed in Japan on Apr. 26, 2010, the entire contents of which are herein incorporated by reference.

BACKGROUND OF THE INVENTION

1. Field of the Invention

The present invention relates to a print system in which a client terminal, a server, and a printer are connected via a network.

2. Description of the Related Art

In recent years, a print system including a client terminal, a server, and a printer is utilized at a workplace such as an office where a plurality of people perform paperwork.

A method called pull printing may be adopted in the print system of this type. In the pull printing method, when a user prints print data such as a document on paper, he/she operates a client terminal, and transmits the print data from the client terminal to a server. The server stores therein the received print data. Next, the user operates a printer so as to print the print data stored in the server. The server transmits the print data to the printer in response to a request from the printer. The printer receives the print data and prints this data.

Since a large number of users share the above print system, it is necessary to ensure the security with regard to information leaks and the like. In view of this, a method of adding user identification information (for example, a password) to print data is adopted. In this method, it is possible to perform an authentication determination of whether a user has print authority by having the user input identification information when print data is printed.

In the above print system, since printing is restricted based on identification information, printing is not permitted to other users who do not have print authority, which has caused a problem that convenience is impaired. Specifically, for example, a boss who has registered print data cannot ask his/her subordinate to print that data.

In view of this, as a method for solving such a problem, an information processing system is also utilized in which print authority information of a document is transmitted from a mobile terminal to another mobile terminal so as to delegate print authority held by the mobile terminal serving as a transmission source to the mobile terminal serving as a transmission destination (for example, see JP 2009-53953A). The delegation of print authority enables the user of the mobile terminal serving as a transmission destination to print the print data that the user of the mobile terminal serving as a transmission source has registered.

However, the above information processing system has a problem that since print authority is delegated to one mobile terminal, the document is not printed unless the mobile terminal serving as a transmission destination is in the state where printing can be performed. Further, the above information processing system also has a problem that a document cannot be distributed to a plurality of users.

SUMMARY OF THE INVENTION

The present invention has been conceived in order to solve the above problems, and an object thereof is to provide a print system that enables printing performed by a plurality of users while ensuring the confidentiality of print data, by specifying users given print authority.

A print system according to the present invention is a print system via a network, wherein a client terminal that generates a print job, a server function portion that stores the print job generated by the client terminal, and a printer that performs pull printing of the print job stored in the server function portion are connected via the network, the print job holds print data that is printed by the printer and authority information including user information for specifying a user having print authority over the print data, and the client terminal includes an authority setting means for setting the authority information. The server function portion is configured to cause execution by an authority information management means for updating the authority information, a user identification means for identifying a user using the user information, an authentication processing means for authenticating, based on the authority information and an identification result obtained by the user identification means, whether or not to permit printing, and a transmission control means for transmitting the print data to the printer depending on the authentication performed by the authentication processing means, and the authority information is configured to include user information on a plurality of users.

Accordingly, print data can be reliably printed by a plurality of users. Specifically, printing performed by a plurality of users is enabled while ensuring the confidentiality of print data, by specifying users given print authority.

In the print system according to the present invention, a configuration may be adopted in which the server function portion is included in a server.

According to this configuration, a print system that enables printing performed by a plurality of users while ensuring the confidentiality of print data can be provided by using the server having the server function portion.

In the print system according to the present invention, a configuration may be adopted in which the server function portion is included in the printer.

According to this configuration, printing performed by a plurality of users is enabled while ensuring the confidentiality of print data, by the printer having the server function portion, for example, a printer server.

Further, in the print system according to the present invention, a configuration may be adopted in which the authority information includes count information for limiting a count of prints of the print data, and the authority information management means deletes print authority of a user registered in the authority information based on the count information.

Accordingly, even in the case where more users are registered in authority information than a count of prints, data can be prevented from being printed more than necessary.

Further, in the print system according to the present invention, the server function portion may be configured to cause execution by a notification generation means for generating a notification to a user, and the notification generation means may be configured to transmit the generated notification to the address of a user designated as a notification address in the authority information, via the transmission control means.

With such a configuration, an appropriate notification can be transmitted to a user address with the notification generation means provided.

Further, in the print system according to the present invention, a configuration may be adopted in which the notification generation means transmits a notification of a print request to the addresses of all users registered as the authority information.

Accordingly, the users registered in authority information can know that print authority has been set for them.

Further, in the print system according to the present invention, a configuration may be adopted in which the authority information includes order information for designating a priority order of users, and the notification generation means transmits a notification of a print request to the address of a user in descending order from the highest in the priority order based on the order information.

Accordingly, a user desired to preferentially print data can be selected, and also the users registered in authority information can know that print authority has been set for them.

Further, in the print system according to the present invention, a configuration may be adopted in which the authority information includes time information for designating a time limit, and the authority information management means deletes, when the print data is not printed within the time limit, print authority of the user notified of the print request based on the time information.

Accordingly, print data can be prevented from being redundantly printed. Further, since the time limit is set, a time period until when print data is printed can be shortened.

Further, in the print system according to the present invention, a configuration may be adopted in which when print authority of all users registered in the authority information has been deleted, and the print data has not been printed, the notification generation means transmits a notification of request failure to the address of a user who registered the print job.

Accordingly, the user who registered the print job can know that the print data has not been printed even when the set time limit is exceeded.

Further, in the print system according to the present invention, a configuration may be adopted in which when the print authority of the user notified of the print request is deleted, the notification generation means transmits a notification of authority deletion to the address of the user whose print authority has been deleted.

Accordingly, the user notified of the print request can know that print authority has been deleted.

Further, in the print system according to the present invention, a configuration may be adopted in which when the print data has been printed, the notification generation means transmits a notification of the end of printing to the address of a user who registered the print job.

Accordingly, the user who registered the print job can know whether the print data has been printed.

BRIEF DESCRIPTION OF THE DRAWINGS

FIG. 2 is an explanatory diagram showing an example of a display screen serving as a print job setting screen.

FIG. 3 is an explanatory diagram showing an example of a structure of a print job.

FIG. 8 is an explanatory diagram showing an example of a notification generated by a notification generation portion.

DESCRIPTION OF PREFERRED EMBODIMENTS

Below is a description of a print system according to an embodiment of the present invention with reference to the drawings.

Figure 1:
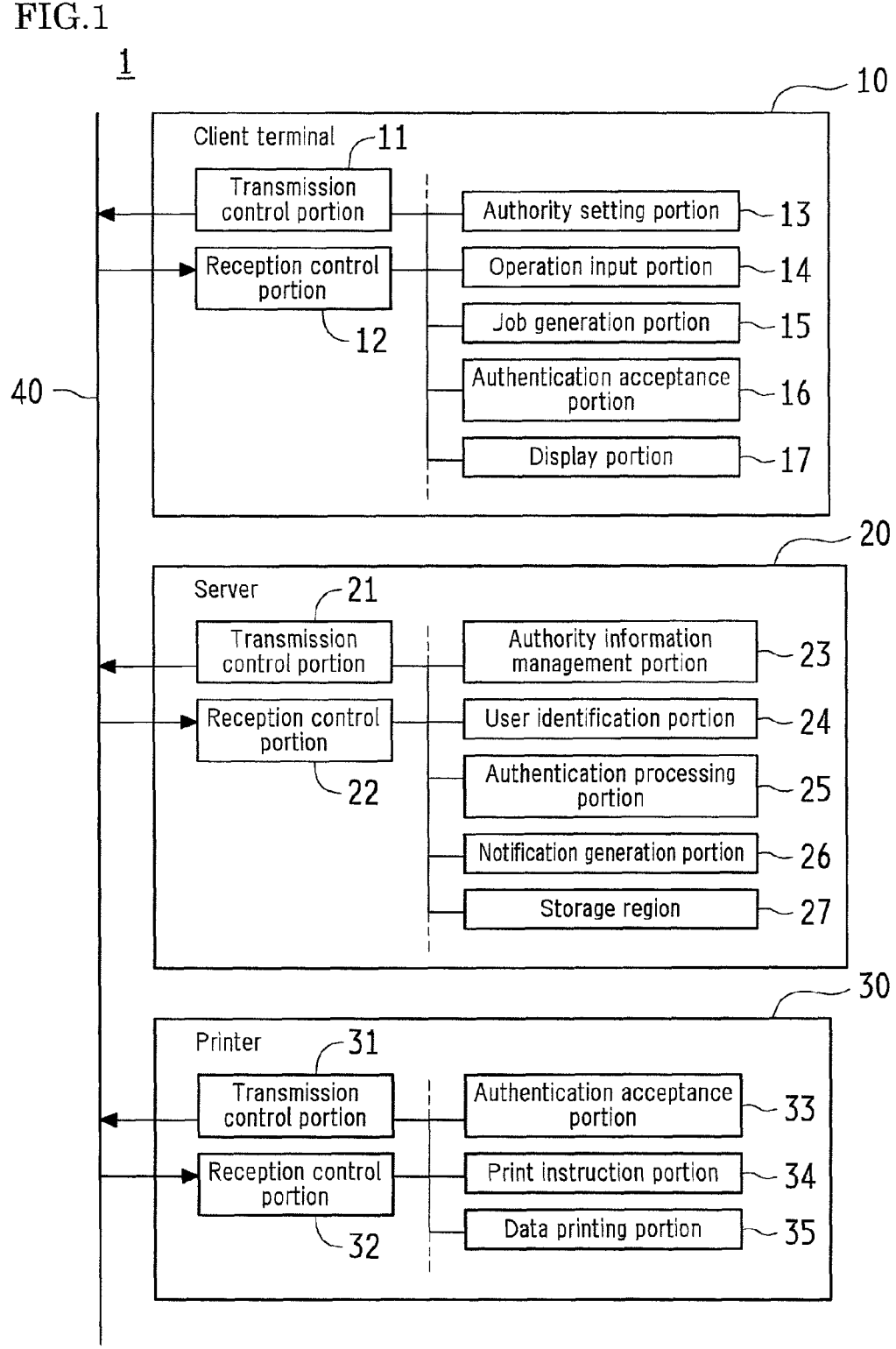
FIG. 1 is a configuration diagram showing the configuration of a print system according to an embodiment of the present invention.

FIG. 1 is a configuration diagram showing the configuration of the print system according to the present embodiment.

In the print system according to the present embodiment, a client terminal 10 that generates a print job, a server function portion (server 20) that stores therein a print job generated by the client terminal 10, and a printer 30 that performs pull printing of the print job stored in the server function portion are connected via a network 40.

A print job holds print data to be printed by the printer 30, and authority information including user information for specifying a user who has print authority over the print data. The client terminal 10 is provided with an authority setting portion 13 for setting authority information. The server function portion causes execution by an authority information management portion 23 that updates authority information, a user identification portion 24 that identifies a user using user information as described above, an authentication processing portion 25 that authenticates whether or not to permit printing based on authority information and the identification result obtained by the user identification portion 24, and a transmission control portion 21 that transmits print data to the printer 30 depending on the authentication performed by the authentication processing portion 25. Authority information includes user information on a plurality of users.

In the print system according to the present embodiment, the server 20 includes the server function portion, and is connected to the network 40. According to this configuration, it is possible to provide a print system that enables printing performed by a plurality of users while ensuring the confidentiality of print data, by using the server 20 that has the server function portion.

The client terminal 10 is provided with a transmission control portion 11, a reception control portion 12, an authority setting portion 13, an operation input portion 14, a job generation portion 15, an authentication acceptance portion 16, and a display portion 17, for instance. Examples of the client terminal 10 include a personal computer and the like.

The transmission control portion 11 is configured as a transmission control means for transmitting a print job generated by the client terminal 10, user identification information described later, and the like to the server 20 via the network 40. The reception control portion 12 receives a user identification result and a notification to the user that have been transmitted from the server 20, and the like.

The authority setting portion 13 is configured as an authority setting means for setting authority information of a print job. Instructions, information, and the like with respect to the portions are input to the operation input portion 14. Examples of the operation input portion 14 include a keyboard, a mouse, and the like. The job generation portion 15 generates a print job in response to an instruction input from the operation input portion 14.

The authentication acceptance portion 16 accepts user identification information. User identification information is user information for specifying a user, and for example, a unique number given to a user, a password, and the like correspond to this. User identification information is input from the operation input portion 14. Further, user identification information may be accepted using an IC card in which user identification information has been recorded.

The display portion 17 displays an instruction to generate a print job, a notification to a user, an authority information setting screen, and the like. Examples of the display portion 17 include a display, a display panel, and the like.

The transmission control portion 11, the reception control portion 12, the authority setting portion 13, and the job generation portion 15 are realized by a computer program (computer) installed in advance in the CPU (central processing unit (not shown)) that the client terminal 10 has.

The server 20 is provided with the transmission control portion 21, a reception control portion 22, the authority information management portion 23, the user identification portion 24, the authentication processing portion 25, a notification generation portion 26, and a storage region 27. Examples of the server 20 include a server computer and the like.

The transmission control portion 21 is configured as a transmission control means for transmitting print data, a user identification result, and the like to the client terminal 10 and the printer 30 via the network 40. The reception control portion 22 is configured as a reception control means for receiving a print job and user identification information that have been transmitted from the client terminal 10 or the printer 30. The authority information management portion 23 is configured as an authority information management means for managing user print authority based on authority information and updating authority information according to the status.

The user identification portion 24 is configured as a user identification means for identifying a user using user information. The user identification portion 24 compares identification information of a user registered in advance with identification information of a user transmitted from the client terminal 10 or the printer 30 so as to identify the user. Further, the address of a user is registered in the user identification portion 24, associated with identification information of the user. The address here corresponds to, for example, an IP address or an e-mail address corresponding to a client terminal and a portable telephone terminal.

The authentication processing portion 25 is configured as an authentication processing means for authenticating whether or not to permit printing, and permits transmission of print data when the user identified by the user identification portion 24 is registered in authority information. The notification generation portion 26 is configured as a notification generation means for generating a predetermined notification to a user according to the operation of the authority information management portion 23 and the authentication processing portion 25. A print job is stored in the storage region 27. An example of the storage region 27 is an HDD (hard disk drive).

The transmission control portion 21, the reception control portion 22, the authority information management portion 23, the user identification portion 24, the authentication processing portion 25, and the notification generation portion 26 are realized by a computer program (computer) installed in advance in the CPU (central processing unit (not shown)) that the server 20 has.

The printer 30 is provided with a transmission control portion 31, a reception control portion 32, an authentication acceptance portion 33, a print instruction portion 34, and a data printing portion 35. The transmission control portion 31 is configured as a transmission control means for transmitting user identification information, an instruction to print a print job, and the like to the server 20 via the network 40.

The reception control portion 32 is configured as a reception control means for receiving print data transmitted from the server 20, and the like. The authentication acceptance portion 33 accepts user identification information, and has the same configuration as that of the authentication acceptance portion 16 of the client terminal 10. It is sufficient to appropriately select a method for inputting user identification information, such as using a keyboard or an IC card.

The print instruction portion 34 instructs to print a print job stored in the server 20 using the printer 30. A method for selecting a print job is not particularly limited, and it is sufficient to appropriately make a selection from among a method for inputting the print job number for identifying a print job, a method for displaying a list of print jobs on a display and selecting a print job from the displayed list, and the like.

The data printing portion 35 is configured as a data printing means for printing received print data. The data printing portion 35 includes a function for image processing using software, and a print engine for printing on paper.

The transmission control portion 31, the reception control portion 32, the authentication acceptance portion 33, and the print instruction portion 34 are realized by a computer program (computer) installed in advance in the CPU (central processing unit (not shown)) that the printer 30 has.

Examples of the network 40 include the Internet, a computer network such as LAN, and the like. Note that the client terminal 10 and the printer 30 that are connected to the network 40 are not limited to being one each, and a plurality of client terminals 10 and printers 30 may be connected thereto. Further, the client terminal 10 may be provided with a user identification portion. This eliminates the need to transmit user identification information to the server 20 when identifying a user.

Although the server 20 that has the server function portion is used in the embodiment, the present invention is not limited to this, and a printer that has the server function portion may be used.

For example, if the printer 30 is provided with the server function portion, it is possible to provide a print system that enables printing performed by a plurality of users while ensuring the confidentiality of print data using the printer server.

At this time, the server function portion is provided with the transmission control portion 21, the reception control portion 22, the authority information management portion 23, the user identification portion 24, the authentication processing portion 25, and the notification generation portion 26, and is realized by a computer program (computer) installed in advance in the CPU (central processing unit (not shown)) that the printer 30 has.

Next, a print job generated by the client terminal 10 is described with reference to FIGS. 2 and 3.

FIG. 2 is an explanatory diagram showing a display screen X serving as a print job setting screen, and FIG. 3 is an explanatory diagram showing an example of a structure of a print job.

The display screen X is a screen for inputting settings of a print job, and is displayed on the display portion 17 when generating a print job. The display screen X includes a paper setting region A1, a registration button 51, and a print authority setting button 52.

In the paper setting region A1, the number of copies of an original (print data) to be printed, the size of the original, the orientation of the original, the number of pages per sheet, and paper information (type of paper) can be input as paper settings for when outputting the original from the printer 30.

The registration button 51 is used for instructing to edit and transmit a print job. Paper settings input in the paper setting region A1 are added to a print job. The print authority setting button 52 is used for setting print authority to another user. If the print authority setting button 52 is selected, a display screen Y (see FIG. 4) described later is displayed instead of the display screen X. Note that a configuration may be adopted in which the authority setting portion 13 is allowed to select whether the display screen X or the display screen Y is displayed when generating a print job, and the print authority setting button 52 is not provided.

The structure of a print job shown in FIG. 3 is transmitted to the server 20 when the registration button 51 in the display screen X is selected. A print job shown in FIG. 3 holds print data and authority information. Print data is data indicating print content such as a document, a photograph, or a drawing, and includes paper settings set in the paper setting region A1. The printer 30 prints print data in accordance with the paper settings.

Authority information includes a print job number, a job registrant ID, and an authority possessor table. A print job number is a number for identifying a print job. A job registrant ID is identification information of a user (job registrant) that has been accepted by the authentication acceptance portion 16 when a print job is generated. An authority possessor table is a table in which identification information of users who have print authority of print data is arranged, and identification information of a plurality of users can be registered therein. Note that it is desirable that the address of a user corresponding to user identification information is designated as a notification address in authority information.

Figure 4:
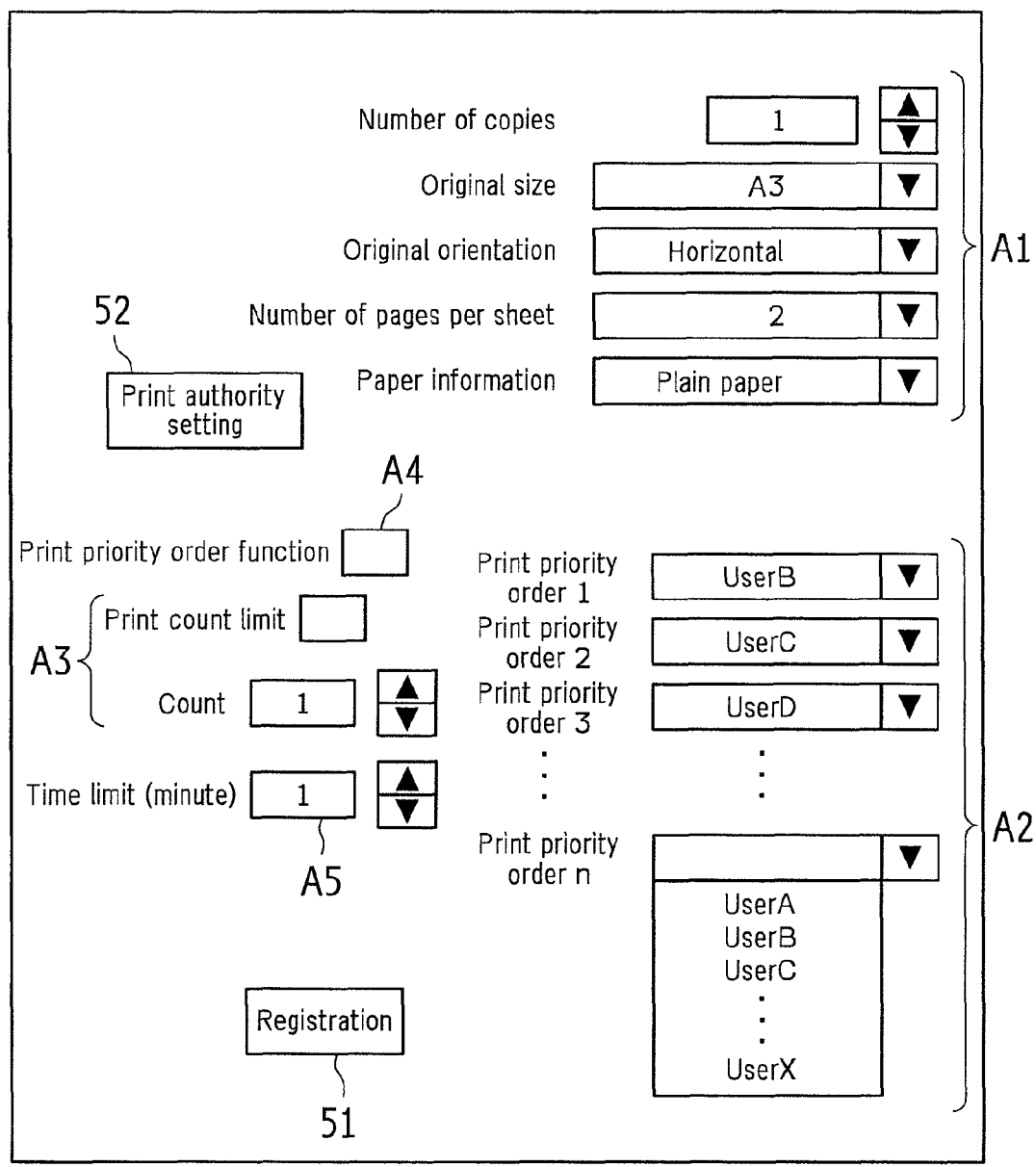
FIG. 4 is an explanatory diagram showing another example of a display screen serving as the print job setting screen.
Figure 5:
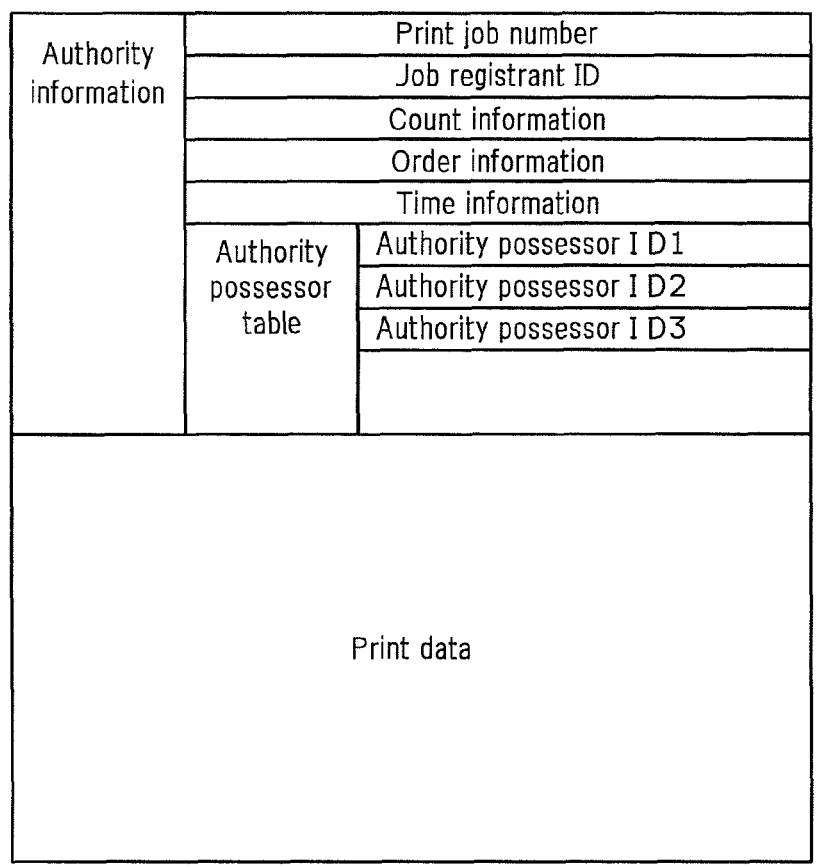
FIG. 5 is an explanatory diagram showing an example of a structure of the print job.

FIG. 4 is an explanatory diagram showing the display screen Y serving as a print job setting screen, and FIG. 5 is an explanatory diagram showing an example of a structure of a print job.

The display screen Y has the same function as that of the display screen X, and is a screen in which print authority settings can be further input. The display screen Y includes the paper setting region A1, the registration button 51, the print authority setting button 52, a user designation region A2, a print count region A3, a priority order region A4, and a time limit region A5. Note that in the following, the user designation region A2, the print count region A3, the priority order region A4, and the time limit region A5 are collectively described as an authority setting region.

The user designation region A2 includes a plurality of input fields, in each of which a user to be given print authority can be input, and identification information of the users that have been input is arranged in the authority possessor table. The number for designating the priority order described later is given to each input field. Although the present embodiment adopts a configuration in which a user is selected from a predetermined user list, and identification information of the selected user is registered in authority information, the present invention is not limited to this, and a configuration may be adopted in which user identification information is input. Note that in the following, a user input in the authority possessor table is referred to as an authority possessor, and identification information of the authority possessor is referred to as an authority possessor ID.

A count permitted for printing print data can be input in the print count region A3, and a count input here is registered in authority information as count information. The priority order region A4 is used for inputting the presence/absence of the priority order for giving print authority, and is registered in authority information as order information when the priority order is present. Note that the priority order can be appropriately set based on the numbers given to the input fields in the user designation region A2.

The time limit within which printing of print data is permitted can be input in the time limit region A5, and the time limit input here is registered in authority information as time information.

The structure of a print job shown in FIG. 5 is a structure of a print job transmitted to the server 20 when the registration button 51 in the display screen Y is selected, and is the same as the structure of a print job shown in FIG. 3. Note that in the authority possessor table, identification information of the users input in the user designation region A2 is arranged. Further, according to the input to the print count region A3, the priority order region A4, and the time limit region A5, authority information includes count information, order information, and time information.

Figure 6:
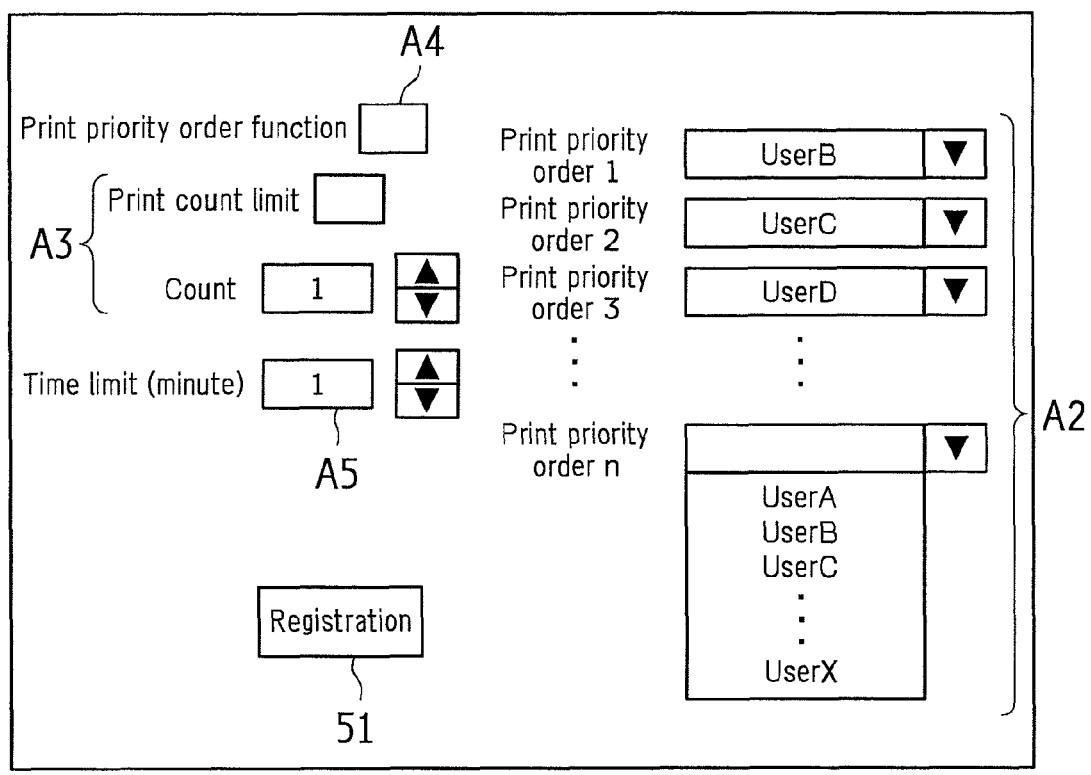
FIG. 6 is an explanatory diagram showing an example of a display screen serving as a print job editing screen.

The print system according to the present embodiment enables editing of authority information of a print job stored in the server 20 using the authority setting portion 13. FIG. 6 is an explanatory diagram showing a display screen Z serving as a print job editing screen.

When an instruction is issued to edit a print job using the authority setting portion 13, the display screen Z is displayed on the display portion 17, and print authority settings can be input therein. The display screen Z includes the registration button 51, the print authority setting button 52, the user designation region A2, the print count region A3, the priority order region A4, and the time limit region A5, each of which has the same function as the function of those in the display screen Y. Note that a configuration may be adopted in which any of the display screen X, the display screen Y, and the display screen Z can be selected using the authority setting portion 13.

Figure 7:
FIG. 7 is an explanatory diagram showing an example of a configuration of authority information stored in a server.

Next, the configuration of a print job stored in the server 20 is described. FIG. 7 is an explanatory diagram showing the configuration of authority information stored in the server. A print job is stored in the storage region 27 of the server 20 with print data and authority information associated with each other. In authority information, a print job number, a job registrant ID, an authority possessor ID, count information, order information, and time information are associated with each other. Further, the authority information management portion 23 updates authority information so as to add/delete thereto/therefrom an authority possessor ID, count information, order information, and time information.

Authority information holds count information for limiting a count of prints of print data. The authority information management portion 23 deletes print authority of a user registered in authority information based on count information. Accordingly, even in a case where more users are registered in authority information than a count of prints, it is possible to prevent data from being printed more than necessary.

The server function portion (the server 20) is configured to cause execution by the notification generation portion 26 that generates a notification to a user. The notification generation portion 26 transmits the generated notification to the address of a user designated as a notification address in authority information via the transmission control portion 21. Accordingly, an appropriate notification can be transmitted to a user address by providing the notification generation portion.

The notification generation portion 26 transmits a notification of a print request to the addresses of all the users registered as authority information. Accordingly, the users registered in authority information can know that print authority has been set for them.

Authority information includes order information for designating the priority order of users. The notification generation portion 26 transmits a notification of a print request to a user address in descending order from the highest in the priority order based on the order information. Accordingly, it is possible to select a user desired to preferentially print data. Further, the users registered in the authority information can know that print authority has been set for them.

Further, authority information includes time information for designating time limit. When print data is not printed within the time limit, the authority information management portion 23 deletes print authority of the user notified of the print request based on the time information. Accordingly, print data can be prevented from being redundantly printed. Further, since the time limit has been set, it is possible to shorten a time period until when print data is printed.

If print authority of all the users registered in the authority information has been deleted, and print data has not been printed, the notification generation portion 26 transmits a notification of request failure to the address of the user who registered the print job. Accordingly, the user who registered the print job can know that the print data has not been printed even after the set time limit is exceeded.

Upon the deletion of print authority of the user notified of the print request, the notification generation portion 26 transmits a notification of authority deletion to the address of the user whose print authority has been deleted. Accordingly, the user notified of the print request can know that his/her print authority has been deleted.

The notification generation portion 26 transmits a notification of the end of printing to the address of the user who registered the print job when print data has been printed. Accordingly, the user who registered the print job can know whether print data has been printed.

Note that authority information that does not hold count information, order information, or time information may be used. Specifically, it is possible to appropriately select whether to set a count of prints, the priority order, and the time limit with respect to a print job.

A notification transmitted from the server 20 is as shown in FIG. 8, for example. FIG. 8 is an explanatory diagram showing an example of a notification generated by the notification generation portion 26. A notification (notification 1 shown in FIG. 8) indicating "printing has been requested from user XX (print request)" is transmitted to the user registered in authority information. A notification (notification 2 shown in FIG. 8) indicating "print authority has been deleted (authority deletion)" is transmitted to a user whose print authority has been deleted.

In the case where the time limit is set, a notification (notification 3 shown in FIG. 8) indicating "data was not printed within the time limit (request failure)" is transmitted to a job registrant when print data has not been printed within the time limit. When print data has been printed, a notification (notification 4 shown in FIG. 8) indicating "printing has ended (end of printing)" is transmitted to a job registrant. When a user who does not have print authority has given an instruction for printing, a notification (notification 5 shown in FIG. 8) indicating "printing is not permitted (printing not allowed)" is transmitted to the printer 30.

Although the case where a notification is transmitted to the client terminal corresponding to the user address is described in the following, the present invention is not limited to this, and a notification may be transmitted to a portable telephone terminal corresponding to the user address, for example.

Next, the operation of the print system according to the present embodiment is described. Here, the flow of processing in the case where a print job is generated in the client terminal 10 and transmitted to the server 20 is described, following the flowchart shown in FIG. 9.

Figure 9:
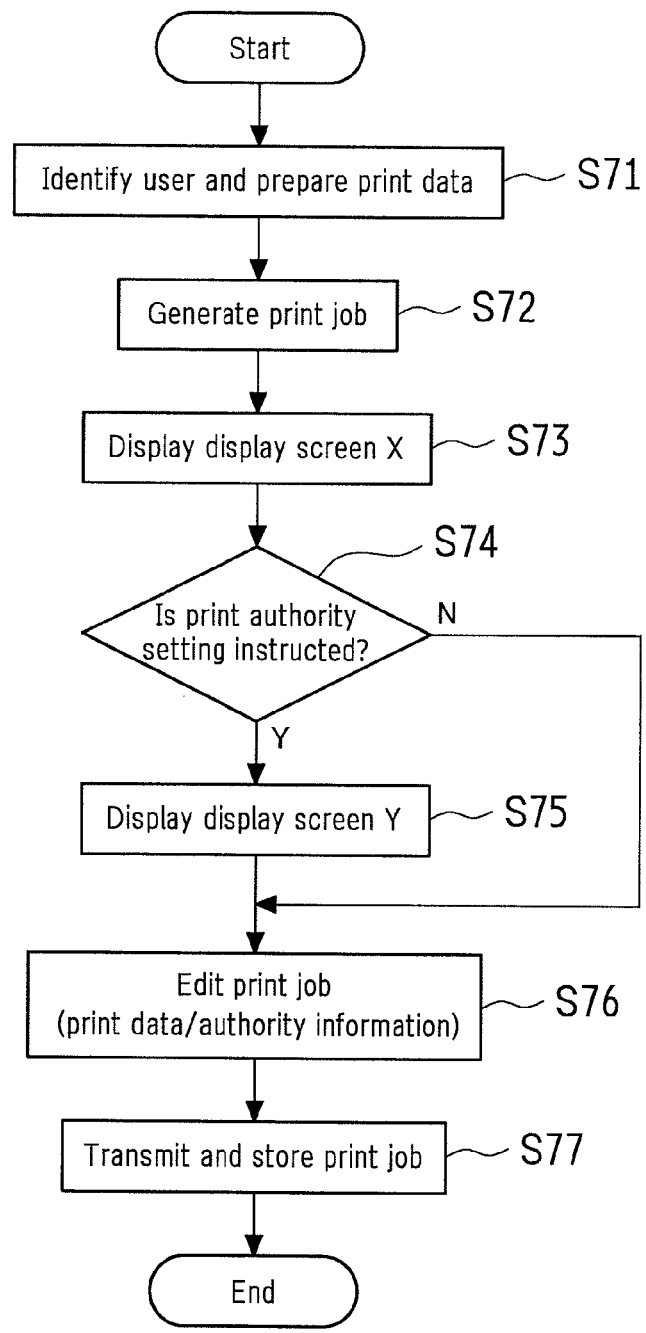
FIG. 9 is a flowchart showing print job registration processing.

FIG. 9 is a flowchart showing print job registration processing. First, user identification and preparation of print data is performed in the client terminal 10 (step S71). Note that when the client terminal 10 is started, a user may be identified, and user identification information input then may be stored. This eliminates the need of repeating user identification when a print job is registered. It is sufficient that print data is stored in the client terminal 10 that is being used, and is selected as appropriate.

The job generation portion 15 generates a print job with respect to the selected print data (step S72), and the display screen X is displayed on the display portion 17 (step S73) so as to accept input from the user. When the user selects the print authority setting button 52 (step S74: YES), the screen that is displayed is switched from the display screen X to the display screen Y (step S75). The content input in the authority setting region in the display screen Y is registered in authority information. In the display screen X or the display screen Y, if the registration button 51 is selected, a print job is edited so as to add paper settings and authority information to a print job (step S76). The generated print job is transmitted from the client terminal 10 to the server 20, and thereafter stored in the storage region 27 (step S77), and processing ends.

The server 20 transmits a notification to the user address based on the authority information. Note that if user identification information is not registered in the authority possessor table, this processing is not performed.

Figure 10:
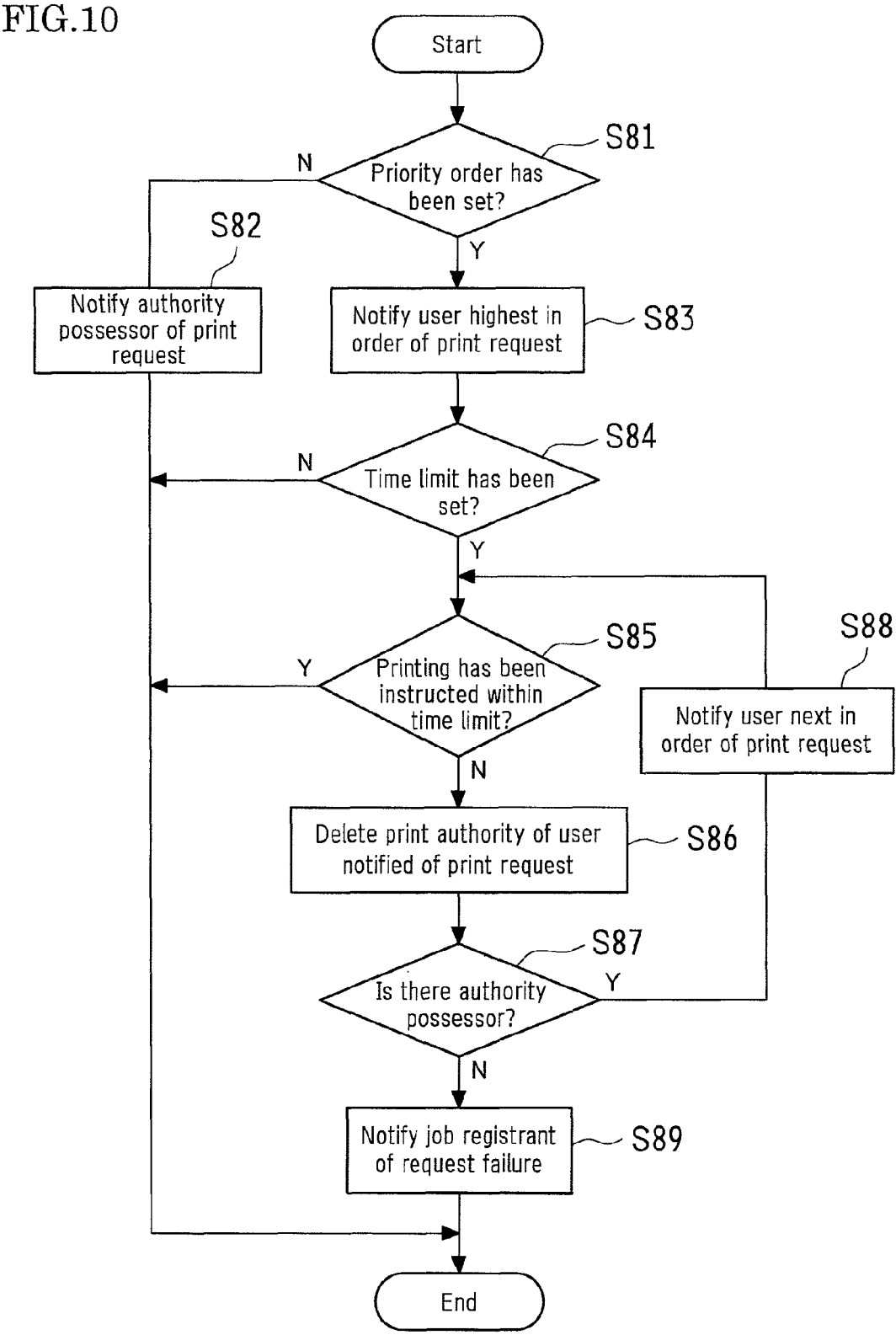
FIG. 10 is a flowchart showing processing for notifying a client terminal performed by the server.

Next is a description of the flow of processing in the case of transmitting a notification from the server 20 to the client terminal 10, following the flowchart shown in FIG. 10.

FIG. 10 is a flowchart showing processing for notifying the client terminal 10 performed by the server 20. First, the authority information management portion 23 determines whether the priority order is set with respect to the authority possessors (step S81). In other words, the authority information management portion 23 confirms the presence/absence of order information. When there is no order information (step S81: NO), an authority possessor is notified of a print request (step S82), and processing ends. Here, the notification generation portion 26 transmits the notification 1 to the address of the authority possessor (the client terminal 10).

When there is order information (step S81: YES), a user highest in the priority order is notified of a print request (step S83). Specifically, the notification generation portion 26 transmits the notification 1 to the address of the authority possessor (the client terminal 10).

Next, the authority information management portion 23 determines whether the time limit has been set (step S84). Specifically, the authority information management portion 23 confirms the presence/absence of time information, and processing ends when there is no time information (step S84: NO).

When there is time information (step S84: YES), the authority information management portion 23 determines whether printing has been instructed by the printer 30 within the time limit (step S85). When printing has been instructed within the time limit (step S85: YES), this processing ends, and print processing described later is performed.

When printing has not been instructed within the time limit (step S85: NO), print authority of the user notified of the print request is deleted (step S86). In order to delete print authority of the user, it is sufficient to delete the authority possessor ID highest in the order from the authority possessor table, for example. Subsequent to step S86, the presence/absence of authority possessor is determined (step S87). When an authority possessor exists (step S87: YES), a notification of a print request is transmitted to the address of the authority possessor lower in the priority order (the client terminal 10) (step S88), and it is determined whether printing has been instructed from the printer 30 within the time limit (step S85).

When an authority possessor does not exist (step S87: NO), the job registrant is notified of request failure (step S89), and processing ends. Here, the notification generation portion 26 transmits the notification 3 to the address of the job registrant (the client terminal 10).

In the print system, authority information of a print job stored in the server 20 can be edited. The flow of processing in the case of editing authority information of a print job stored in the server 20 using the authority setting portion 13 is described, following the flowchart shown in FIG. 11.

Figure 11:
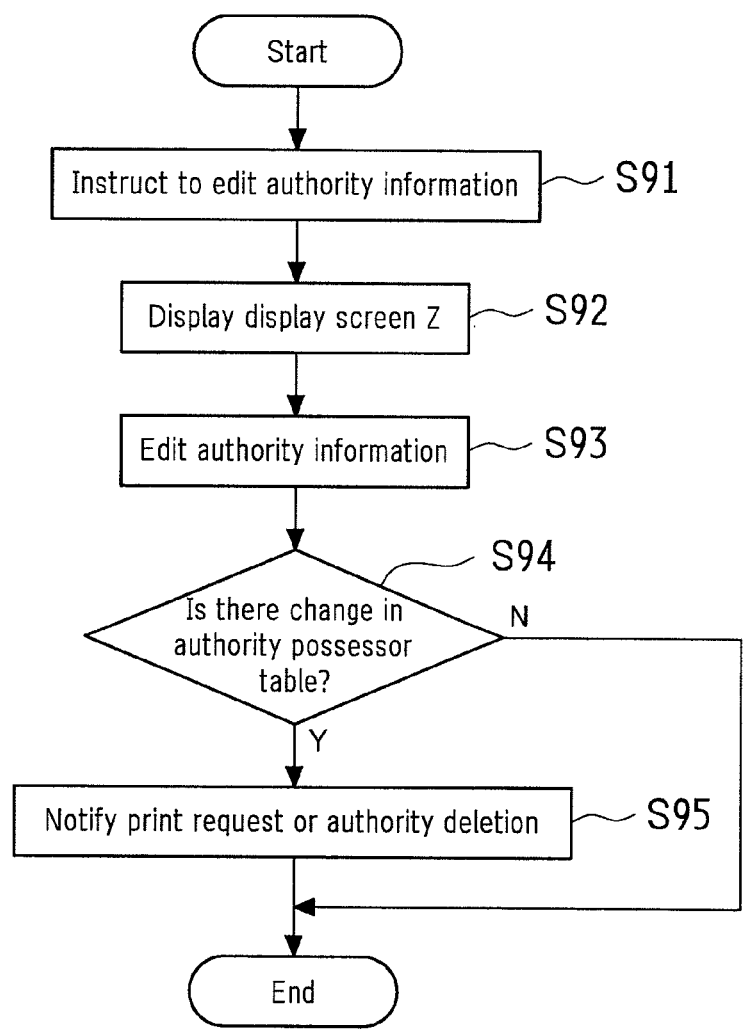
FIG. 11 is a flowchart showing print job editing processing.

FIG. 11 is a flowchart showing print job editing processing. First, the authority setting portion 13 instructs to edit authority information (step S91). Which print job is to be subjected to editing processing can be determined based on the designation of the print job number when editing authority information. A user can be allowed to know the print job number to be designated by notifying the user of the print job number when the print job is generated or by enabling a print job stored by the client terminal 10 in the server 20 to be browsed.

If authority information to be edited is instructed, the display screen Z is displayed on the display portion 17 (step S92), and the input from the user is accepted. If the registration button 51 is selected, authority information is edited (step S93). The authority information management portion 23 determines, with regard to the edited authority information, whether there is a change in the authority possessor table, and processing ends when there is no change (step S94: NO). When there is a change in the authority possessor table (step S94: YES), an authority possessor who has been added is notified of a print request, an authority possessor who has been deleted is notified of authority deletion (step S95), and processing ends. Here, the notification generation portion 26 transmits the notification 1 to the address of the added authority possessor (the client terminal 10), and transmits the notification 2 to the address of the deleted authority possessor (the client terminal 10). Notification processing shown in FIG. 10 may be performed after editing processing. At this time, the user notified of the print request does not need to be notified again of a print request.

Figure 12:
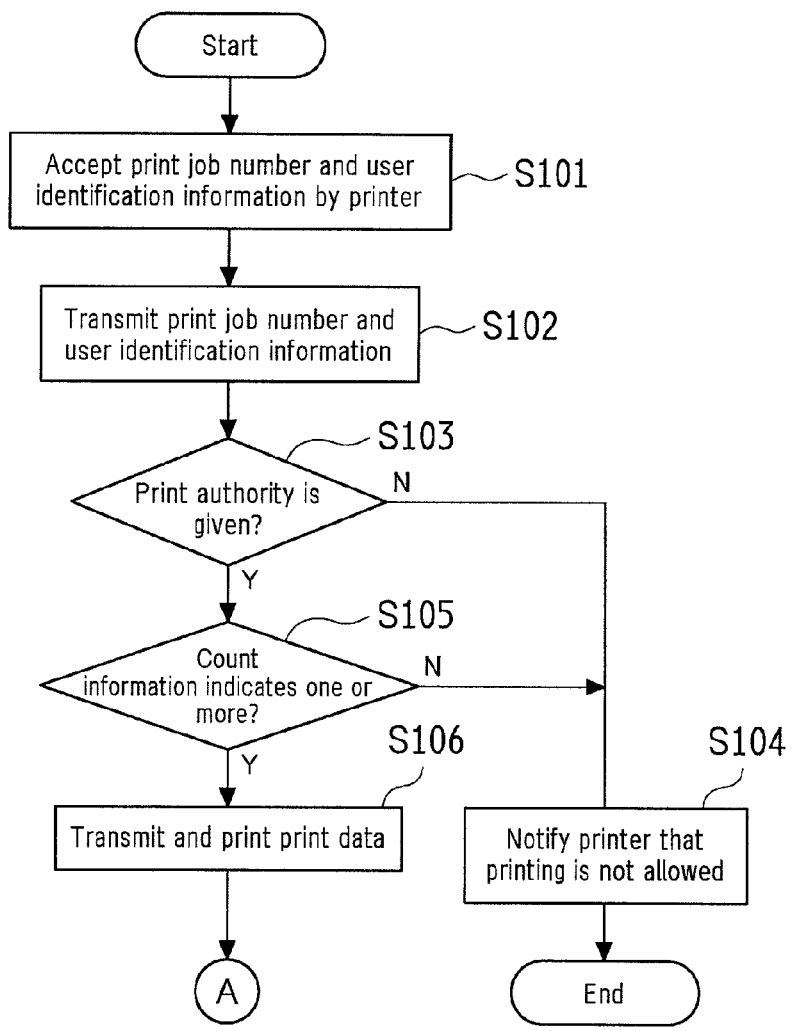
FIG. 12 is a flowchart showing print processing performed by a printer.

Next, the flow of processing in the case where print data is printed by the printer 30 is described, following the flowchart shown in FIG. 12.

FIG. 12 is a flowchart showing print processing performed by the printer 30. First, the authentication acceptance portion 33 accepts user identification information, and the print instruction portion 34 designates a print job number (step S101). Note that in the following, user identification information accepted by the printer 30 is referred to as a print requestor ID to facilitate a description. After that, the print job number and the print requestor ID are transmitted from the printer 30 to the server 20 (step S102). The server 20 can identify a user using the print requestor ID, and identify a corresponding print job using the print job number. Note that in the following, a user identified using the print requestor ID is referred to as a print requestor.

The server 20 determines whether the print requestor has print authority (step S103). Specifically, when the print requestor ID is compared with the job registrant ID and the authority possessor ID, and the result shows that the print requestor ID matches either of them, the authentication processing portion 25 authenticates that the print requestor has print authority.

When the print requestor does not have print authority (step S103: NO), printing is not permitted, and thus the printer 30 is notified that printing is not allowed (step S104), and processing ends. Here, the notification generation portion 26 transmits the notification 5 to the printer 30.

When the print requestor has print authority (step S103: YES), determination based on count information is performed (step S105). When count information indicates 0 (step S105: NO), since printing is not permitted, the server 20 notifies the printer 30 that printing is not allowed (step S104), and processing ends.

When count information indicates one or more (step S105: YES), the server 20 transmits print data to the printer 30, and print data is printed by the printer 30 (step S106). Note that when there is no count information in step S105, since a count of prints is not limited, printing is permitted, and the processing proceeds to step S106. The server 20 performs post print processing shown in FIG. 13 when print data is transmitted.

Figure 13:
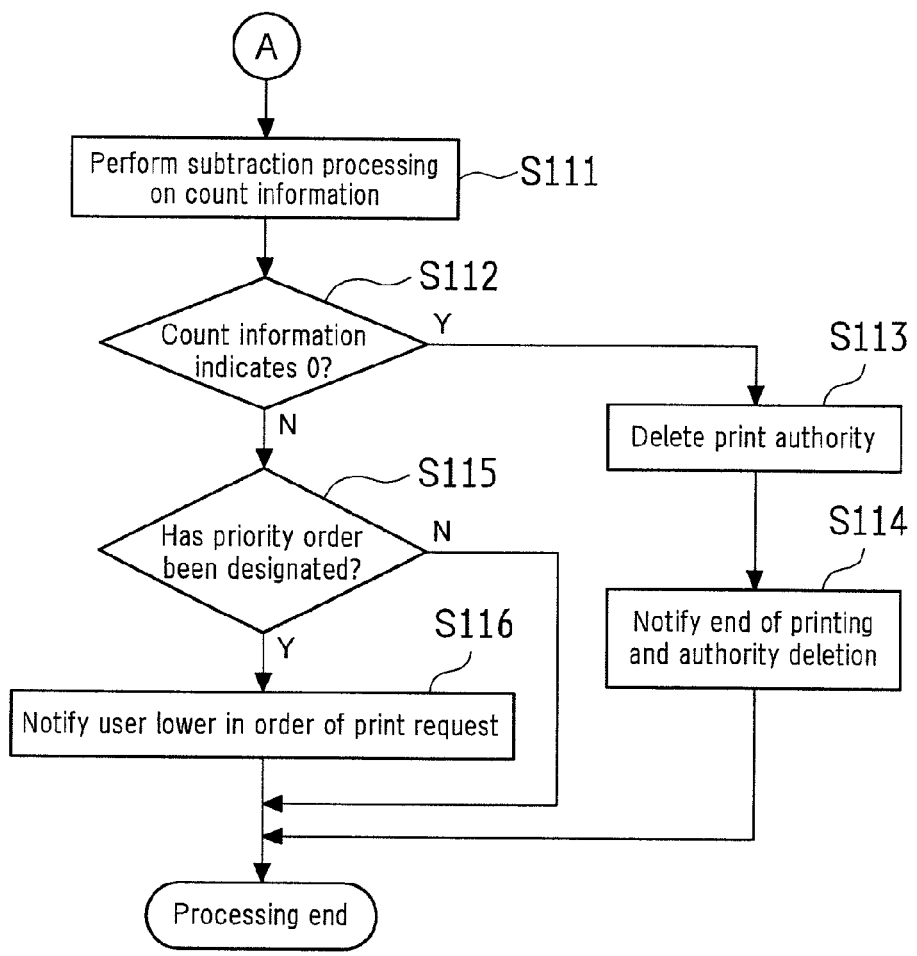
FIG. 13 is a flowchart showing post print processing performed by the server.

Next, the flow of post print processing performed after printing print data is described, following the flowchart shown in FIG. 13.

FIG. 13 is a flowchart showing post print processing performed by the server 20. First, the authority information management portion 23 performs subtraction processing on count information (step S111), and it is determined whether the subtracted count information indicates 0 (step S112). Note that when there is no count information, the processing proceeds to step S115 described later.

When count information indicates 0 (step S112: YES), the authority information management portion 23 deletes print authority of an authority possessor (step S113). After that, the job registrant is notified of the end of printing, the authority possessor is notified of authority deletion (step S114), and processing ends. Here, the notification generation portion 26 transmits the notification 4 to the address of the job registrant (the client terminal 10), and transmits the notification 2 to the address of the authority possessor (the client terminal 10).

When count information does not indicate 0 (step S112: NO), it is determined whether the priority order has been designated (step S115). In other words, the authority information management portion 23 confirms the presence/absence of order information. When there is no order information (step S115: NO), processing ends without performing anything.

When there is order information (step S115: YES), a user lower in the priority order is notified of a print request (step S116), and processing ends. Here, the notification generation portion 26 transmits the notification 1 to the address of the user lower in the priority order (the client terminal 10). Note that if the user lower in the order is notified of a print request, the processing proceeds to step S84 in FIG. 10, and the server 20 performs notification processing.

Consequently, print data can be reliably printed by a plurality of users. Specifically, printing performed by a plurality of users is enabled while ensuring the confidentiality of print data, by specifying users given print authority.

According to the above print system, the following usage is possible, for example.

If a document is distributed to other users, the following is frequently performed that the document is printed, and the content of the document is confirmed to have no flaw. For distributing a document to other users after performing such trial printing, it is necessary to again instruct printing.

In the above case, in the print system, the user who registered the print job can print in advance print data and confirm the content before giving print authority to other users. Then, the print job stored in the server is edited after confirming that there is no flow in the print data, which eliminates the need to newly generate a print job, thus enabling reduction in time and effort in printing.

Note that in the case where a user does not need a document at hand, and distributes the document to other users, it is sufficient to give print authority to other users when registering the print job in the print system.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A print system via a network,
wherein a client terminal that generates a print job, a server function portion that stores the print job generated by the client terminal, and a printer that performs pull printing of the print job stored in the server function portion are connected via the network,
the print job holds print data that is printed by the printer and authority information including user information for specifying a user having print authority over the print data,
the client terminal includes an authority setting means for setting the authority information,
the server function portion is configured to cause execution by:
an authority information management means for updating the authority information;
a user identification means for identifying a user using the user information;
an authentication processing means for authenticating, based on the authority information and an identification result obtained by the user identification means, whether or not to permit printing; and
a transmission control means for transmitting the print data to the printer depending on the authentication performed by the authentication processing means,
the authority information includes user information on a plurality of users and order information for designating a priority orders of users,
the server function portion causes execution by a notification generation means for generating a notification to a user, and
the notification generation means transmits the generated notification to the address of a user designated as a notification address in the authority information, via the transmission control means, and transmits a notification of a print request to the address of a user in descending order from the highest in the priority order based on the order information.

2. The print system according to claim 1,
wherein the server function portion is included in a server.

3. The print system according to claim 2,
wherein the authority information includes count information for limiting a count of prints of the print data, and
the authority information management means deletes print authority of a user registered in the authority information based on the count information.

4. The print system according to claim 2,
wherein the server function portion causes execution by a notification generation means for generating a notification to a user, and
the notification generation means transmits the generated notification to the address of a user designated as a notification address in the authority information, via the transmission control means.

5. The print system according to claim 1,
wherein the server function portion is included in the printer.

6. The print system according to claim 5,
wherein the authority information includes count information for limiting a count of prints of the print data, and
the authority information management means deletes print authority of a user registered in the authority information based on the count information.

7. The print system according to claim 5,
wherein the server function portion causes execution by a notification generation means for generating a notification to a user, and
the notification generation means transmits the generated notification to the address of a user designated as a notification address in the authority information, via the transmission control means.

8. The print system according to claim 1,
wherein the authority information includes count information for limiting a count of prints of the print data, and
the authority information management means deletes print authority of a user registered in the authority information based on the count information.

9. The print system according to claim 1,
wherein the authority information includes time information for designating a time limit, and
the authority information management means deletes, when the print data is not printed within the time limit, print authority of the user notified of the print request based on the time information.

10. The print system according to claim 9,
wherein when print authority of all users registered in the authority information has been deleted, and the print data has not been printed, the notification generation means transmits a notification of request failure to the address of a user who registered the print job.

11. The print system according to claim 9,
wherein when the print authority of the user notified of the print request has been deleted, the notification generation means transmits a notification of authority deletion to the address of the user whose print authority has been deleted.

12. The print system according to claim 9,
wherein when the print data has been printed, the notification generation means transmits a notification of the end of printing to the address of the user who registered the print job.

13. The print system according to claim 1,
wherein when the print data has been printed, the notification generation means transmits a notification of the end of printing to the address of the user who registered the print job.

* * * * *